(12) United States Patent
Colbourne et al.

(10) Patent No.: US 6,768,874 B1
(45) Date of Patent: Jul. 27, 2004

(54) CHROMATIC DISPERSION COMPENSATION DEVICE

(75) Inventors: Paul Colbourne, Nepean (CA); Jimin Xie, Alymer (CA); Xiaoli Fu, Nepean (CA)

(73) Assignee: JDS Fitel Inc., Ottawa (CA)

( * ) Notice: Subject to any disclaimer, the term of this patent is extended or adjusted under 35 U.S.C. 154(b) by 573 days.

(21) Appl. No.: 09/702,861

(22) Filed: Nov. 1, 2000

Related U.S. Application Data

(63) Continuation-in-part of application No. 09/434,376, filed on Nov. 5, 1999.

(51) Int. Cl.$^7$ ............................................. H04B 10/12
(52) U.S. Cl. ...................... 398/147; 398/81; 398/180; 398/159
(58) Field of Search ..................... 385/24; 398/147, 398/81, 180, 159, 192

(56) References Cited

U.S. PATENT DOCUMENTS

| | | | | |
|---|---|---|---|---|
| 4,969,740 A | * | 11/1990 | Sonobe ........................ | 356/326 |
| 5,557,468 A | | 9/1996 | Ip ................................ | 359/615 |
| 6,125,220 A | * | 9/2000 | Copner et al. ................ | 385/27 |
| 6,154,470 A | * | 11/2000 | Basting et al. ................ | 372/19 |

FOREIGN PATENT DOCUMENTS

| | | | | |
|---|---|---|---|---|
| EP | 0 732 819 | | 9/1996 | ........... H04B/10/18 |
| EP | 0 810 699 | | 12/1997 | ............. H01S/3/06 |
| EP | 0 874 489 | | 10/1998 | ............. H04J/14/02 |
| EP | 0 933 657 | | 8/1999 | ........... G02B/6/293 |
| EP | 1 235086 | * | 8/2002 | |
| JP | 7-142805 | * | 6/1995 | |

OTHER PUBLICATIONS

European Search Report for EP Application 00 811 022.3, Feb. 26, 2001.

* cited by examiner

*Primary Examiner*—Hung N. Hgo
(74) *Attorney, Agent, or Firm*—Teitelbaum & MacLean; Neil Teitelbaum

(57) ABSTRACT

A method and device is disclosed for dispersion compensation of an optical signal having periodic dispersion within a multi-channels system. For example interleaved optical channels often exhibit dispersion having a characteristic that is repeated in adjacent channels. By providing a periodic device in the form of a multi-cavity GT etalon having a free-spectral range that corresponds to the channel spacing the dispersion in the interleaved signal can be lessened and practically obviated or balanced to a desired level. Advantageously, the input and output angle of the signal can be varied to provide fine tuning. This invention provides a device and method to achieve that end.

11 Claims, 9 Drawing Sheets

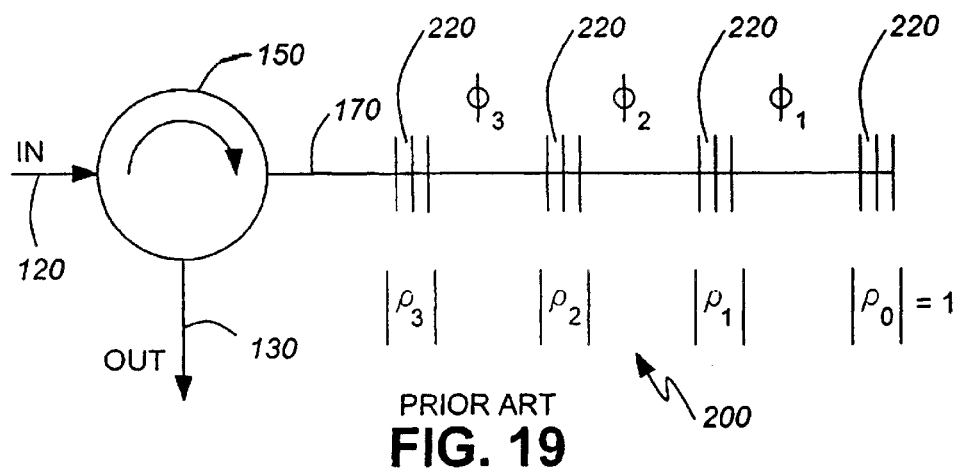
PRIOR ART
FIG. 19
Figure 20a
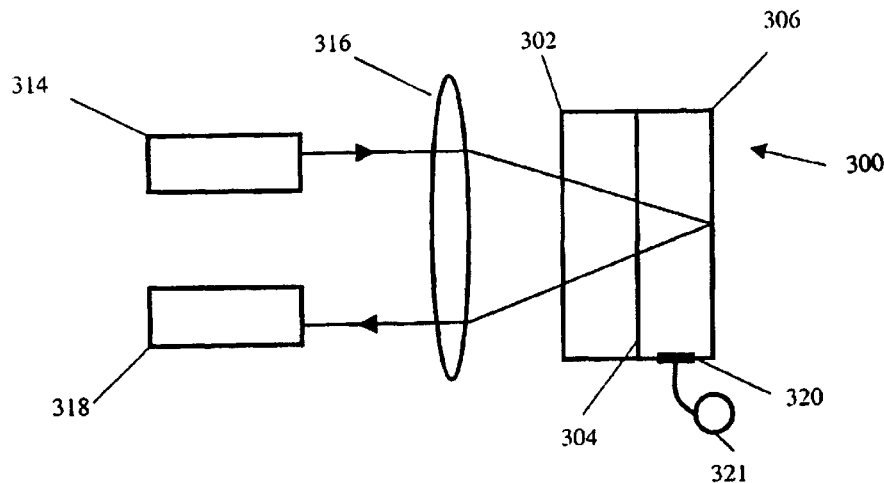
Figure 20b
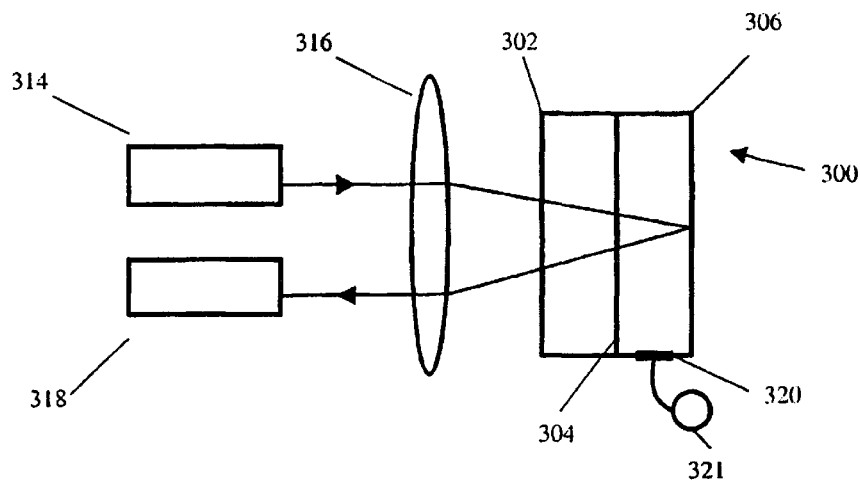

CHROMATIC DISPERSION COMPENSATION DEVICE

This application is a continuation-in-part of application Ser. No. 09/434,376 filed Nov. 5, 1999.

FIELD OF THE INVENTION

This invention relates generally to a device for compensation of chromatic dispersion in optical fiber communication systems.

BACKGROUND OF THE INVENTION

Most high-speed fiber optic communication systems today use externally modulated lasers to minimize laser 'chirp' and reduce the effects of chromatic dispersion in the fiber. Even with external modulation, there is a certain amount of 'chirp' or broadening of the laser spectrum, because any modulated signal must contain frequency 'sidebands' which are roughly as wide as the modulation rate. Higher bit rate transmission systems consequently have broader frequency sidebands, and at the same time can tolerate less phase delay because of the shorter bit period. Next-generation high bit rate systems are consequently very sensitive to chromatic dispersion of the optical fiber and any components such as WDM's within the system.

Chromatic dispersion of optical fiber is roughly constant over the 1550 nm communication window, and can be compensated by several techniques including dispersion compensating fiber, FBG's, etc. However, certain wavelength filtering components such as WDM's can have significant dispersion characteristics due to a fundamental Kramers-Kronig type relationship between transmission spectrum and dispersion characteristics. This type of dispersion characteristic typically varies substantially over the narrow WDM passband, and therefore is difficult to compensate using conventional techniques such as dispersion compensating fiber. It is one objective of the present invention to compensate for the dispersion from WDM devices, including multiplexers, demultiplexers, and interleavers. Conventional laser systems are known to utilize directly modulated semiconductor lasers. In combination with chromatic dispersion characteristics of single-mode optical fiber, chirping of these lasers contributes to the spread of optical pulses and results in intersymbol interference and overall degradation in transmission. Current and "next-generation" high speed systems employ transmitters which use narrow linewidth lasers and external modulators in a window or range of wavelengths about 1550 nm. These external modulators generally have a very low chirp; some designs have a zero or negatively compensating chirp. Nevertheless, transmission distance is still dispersion-limited to about 80 kilometers at transmission rates of 10 Gb/s using conventional single mode fibers.

One solution to this problem is in the use of dispersion shifted fiber which has little dispersion in the 1550 nm window. However, replacing existing fiber with dispersion shifted fiber is costly. Other approaches have been proposed such as optical pulse shaping to reduce laser chirp, using a semiconductor laser amplifier to impose a chirp on the transmitted signal that counteracts the chirping of the directly modulated semiconductor laser.

Approaches that are more consistent with the teachings of this invention attempt to reduce the intersymbol interference at or near the receiver, or intermediate the transmitter and the receiver. Essentially any medium capable of providing a sufficient dispersion opposite to that of the optical fiber can serve as an optical pulse equalizer. For example it is known to use a special optical fiber having an equal chromatic dispersion at a required operating wavelength but opposite in sign to that of the transmitting fiber. Other methods include the use of fiber Bragg gratings as disclosed in U.S. Pat. No. 5,909,295 in the name of Li et al., and disclosed by Shigematsu et al., in U.S. Pat. No. 5,701,188 assigned to Sumitomo Electric Industries, Ltd., and the use of planar lightwave circuit (PLC) delay equalizers. Unfortunately, special compensating fiber has a very high insertion loss and in many applications is not a preferable choice. Fiber gratings are generally not preferred for some field applications due to their narrow bandwidth, and fixed wavelength. PLCs are also narrow band, although tunable devices; fabricating a PLC with large dispersion equalization remains to be difficult. Shigematsu et al. disclose a hybrid of both of these less preferred choices; dispersion compensating fibre with chirped Bragg gratings.

In a paper entitled "Optical Equalization to Combat the Effects of Laser Chirp and Fiber Dispersion" published in the Journal of Lightwave Technology. Vol. 8, No. 5, May 1990, Cimini L. J. et al. describe an optical equalizer capable of combating the effects of laser chirp and fiber chromatic dispersion on high-speed long-haul fiber-optic communications links at 1.55 $\mu$m. Also discussed is a control scheme for adaptively positioning the equalizer response frequency. Cimini et al. describe a device having only one common input/output port at a first partially reflective mirror and a second 100% reflective mirror together forming a cavity. The control scheme described attempts to track signal wavelength by obtaining feedback from a receiver. The amplitude response of the equalizer is essentially flat with wavelength at the input/output port, and thus, the proposed control scheme is somewhat complex requiring processing of high speed data at the optical receiver. As well, the proposed control method is stated to function with RZ signals but not with NRZ signals, a more commonly used data format. Although the equalizer described by Cimini et al. appears to perform its intended basic dispersion compensating function, there exists a need for an improved method of control of the position of the equalizer frequency response, and as well, there exists a need for an equalizer that will provide a sufficient time shift over a broader range of wavelengths. U.S. Pat. No. 5,023,947 in the name of Cimini et al., further describes this device.

A Fabry-Perot etalon having one substantially fully reflective end face and a partially reflective front face is known as a Gires-Tournois (GT) etalon. In a paper entitled Multifunction optical filter with a Michelson-Gires-Turnois interferometer for wavelength-division-multiplexed network system applications, by Benjamin B. Dingle and Masayuki Izutsu published 1998, by the Optical Society of America, a device is described which is hereafter termed the MGT device. The MGT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12r and a front reflector 12f having a reflectivity of about 10%; hence an output signal from only the front reflector 12f is utilized.

In an article entitled "Optical All-Pass Filters for Phase Response Design with Applications for Dispersion Compensation" by C. K. Madsen and G. Lenz, published in *IEEE Photonics Letters*, Vol 10 No. 7, July 1998, a coupled reflective cavity architecture in optical fibre, as shown in FIG. 19, is described for providing dispersion compensation. Cavities are formed in the optical fiber between fiber Bragg grating reflectors. However a multi-cavity filter in fiber has a limited free spectral range (FSR) insufficient for a telecommunications system. For a typical 100 GHz FSR required in the telecommunications industry, the cavity length is about 1 mm. A Bragg grating reflector, if manufactured using commonly available grating-writing techniques, would need to be longer than 1 mm, and hence the two reflector cavity structure would be too long to achieve the necessary FSR. Another draw back to this prior art solution is the requirement for an expensive optical circulator to separate the input and output signals.

As of late, interleaving/de-interleaving circuits are being used more widely. These specialized multiplexor/demultiplexors serve the function of interleaving channels such that two data streams, for example a first stream consisting of channel 1, 3, 5, 7, and so on, is interleaved, or multiplexed with a second stream of channels, 2, 4, 6, 8, and so on, for form single signal consisting of channels 1, 2, 3, 4, 5, 6, 7, 8, and so on. Of course the circuit can be used oppositely, to de-interleave an already interleaved signal, into plural de-interleaved streams of channels. One such interleaver circuit is described in U.S. Pat. No. 6,125,220 issued Sep. 26, 2000 in the name of Copner et al., and another is in U.S. Pat. No. 6,040,932 issued Mar. 21, 2000 in the name of Colbourne et. al. Although interleaver circuits perform a desired function, it has been discovered that some of these circuits suffer if from unwanted periodic chromatic dispersion within each channel. It is this type of periodic dispersion that can be obviated or lessened by the instant invention. It should also be noted that in many instances it is not desirable to completely eliminate all chromatic dispersion; it is believed that a small amount of such dispersion can be useful in reducing non-linear effects in WDM systems; therefore, the instant invention can be used to lessen dispersion by a required amount.

Hence, it is an object of this invention to overcome some of the limitations of the prior art described above. Furthermore, it is an object of the invention to provide a passive device that will compensate for or lessen dispersion over a plurality of interspaced wavelength channels simultaneously.

SUMMARY OF THE INVENTION

In accordance with the invention there is provided, a method of dispersion compensation for simultaneously compensating for dispersion present within individual channels in a multi-channel system having a multi-channel signal, having a predetermined channel spacing between adjacent channels, the method comprising the steps of: providing a GT resonator including at least two optical cavities; and, launching the multi-channel signal into the GT resonator at a first angle and capturing a return signal from the GT resonator at a second angle.

In accordance with the invention there is further provided, a method of simultaneously providing dispersion compensation within a plurality of channels in a multi-channel optical signal having predetermined channel spacing between adjacent channels, comprising the steps of: providing the multi-channel optical signal requiring dispersion compensation of individual channels within the optical signal;

launching the optical signal at a first angle into a periodic device having a substantially unchanging amplitude output response with respect of the wavelength of the optical signal, the periodic device having an output response which varies periodically in phase with respect to wavelength of the optical signal, the periodically varying phase having a correspondence with the channel spacing; and, receiving a dispersion compensated output signal at a second angle having its dispersion adjusted by the periodic device in a periodic manner which has a correspondence to the channel spacing.

In accordance with the invention there is further provided, a method of dispersion compensation of individual channels simultaneously in a multi-channel signal having a predetermined channel spacing between adjacent channels, wherein the GT resonator has a free-spectral range that is equal to or that is an integer multiple of or integer fraction of the channel spacing of the multi-channel optical system.

In another aspect of the invention there is provided, a dispersion compensation device for compensating a multi-channel optical signal having a channel spacing which is periodic, comprising: a multi-cavity etalon having at least one end face that is highly reflective and substantially not transmissive to light and at least two other faces that are partly reflective and partly transmissive, the one and face and the at least two other faces being separated from one another by predetermined gaps, the at least three faces forming at least two resonating cavities.

In accordance with an alternative embodiment of the invention in a multi-channel optical system, having a multiplexed multi-channel optical signal wherein the optical signal has periodic dispersion repeating in each channel, the channels being spaced in periodic manner, wherein the distance between centre wavelengths of adjacent channels is predetermined and a channel width is predetermined, there is provided, a method of simultaneously compensating for the periodic dispersion in each channel comprising the steps of:

launching the optical signal into an optical device having an input/output response in amplitude that is substantially unchanging, and that has an input/output response that varies in dispersion periodically and substantially oppositely to the periodic dispersion repeating in each channel of the multi-channel optical signal.

In accordance with the invention there is provided, an optical system for providing interleaving of optical channels into an optical signal and for providing dispersion compensation of the interleaved optical channels, comprising:

an interleaver optical circuit for interleaving the channels into the optical signal; and, a multi-cavity etalon, one of the cavities being a GT cavity, at least one of the cavities having a free spectral range that corresponds with channels spacing of the interleaved optical channels, the multi-cavity etalon having a periodic dispersion characteristic that is substantially opposite in slope to the slope of periodic dispersion within the channels within the optical signal, the multi-cavity etalon being disposed to receive the optical signal from the interleaver optical circuit, the multi-cavity etalon having an amplitude response that is substantially unchanging over wavelengths corresponding to the interleaved channels.

Advantageously, the multi-cavity etalon in accordance with the present invention has an FSR in the range of 25 GHz to 400 GHz, suitable for telecommunications applications.

BRIEF DESCRIPTION OF THE DRAWINGS

Exemplary embodiments of the invention will now be described in conjunction with the drawings in which:

FIG. 19 is a schematic illustration of a prior art coupled reflective cavity device in optical fibre for providing dispersion compensation; and, FIGS. 20a and 20b illustrate a bulk multi-cavity etalon in accordance with the present invention, showing input and output launched at high and low angles for wavelength tuning.

DETAILED DESCRIPTION

Figure 1:
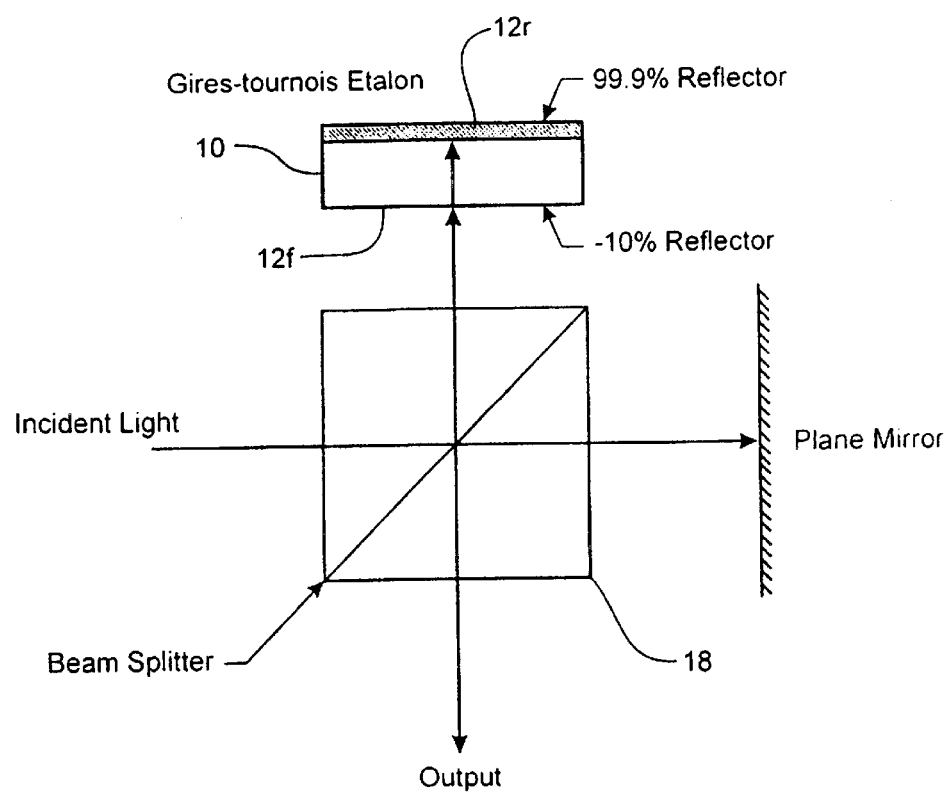
FIG. 1 is a circuit block diagram of a prior art Michelson-Gires-Tournois interferometer.
Figure 2:
FIG. 2 is a graph of amplitude versus wavelength of output response of a de-interleaver device.
Figure 3:
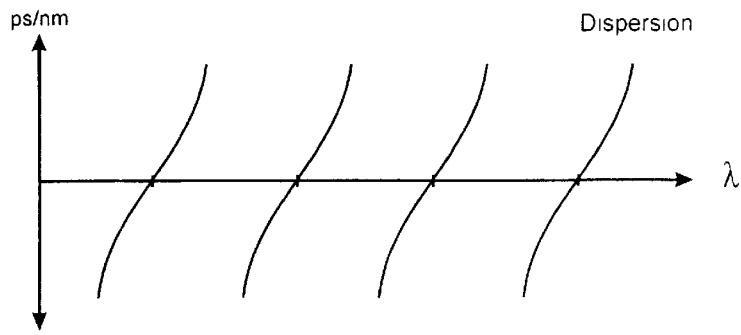
FIG. 3 is a graph of dispersion versus wavelength for the de-interleaver referenced in FIG. 2.

Turning now to FIG. 1, a block diagram of a prior art Michelson-Gires-Tournois interferometer is shown which serves as a narrow band wavelength demultiplexor/multiplexor in the form of an interleaver/de-interleaver circuit. As was described above, interleaver circuits often suffer from unwanted chromatic dispersion, which is repeated in adjacent channels in a multi-channel system. It is important to note that the dispersion within a channel, repeats itself within adjacent channels as will be seen from the following graphs. FIG. 2 illustrates the intensity response for an interleaver circuit wherein intensity is plotted against wavelength, assuming the interleaver is presented with light of equal intensity in the range of operation of the interleaver circuit. Referring now to FIG. 3, the dispersion of the interleaver plotted against wavelength is shown; the result is a periodic response illustrating that each narrow band channel suffers similarly. Thus the dispersion profile, in each channel is nearly identically repeated, rather than simply being a linear phenomenon across the range of wavelengths covering the channels of interest. Quite surprisingly, there is substantially no dispersion between centre wavelengths in adjacent channels; and, typical a single typical linear-type of dispersion compensator would not provide the required compensation. Removing individual channels and providing dispersion compensation on each channel would be difficult, costly, and would introduce substantial unwanted loss into the system, as "n" dispersion compensators would be required to compensate "n" channels.

Figure 4:
FIG. 4 is a graph of dispersion versus wavelength as a desired output response for dispersion related to the de-interleaver of FIG. 2.
Figure 13A:
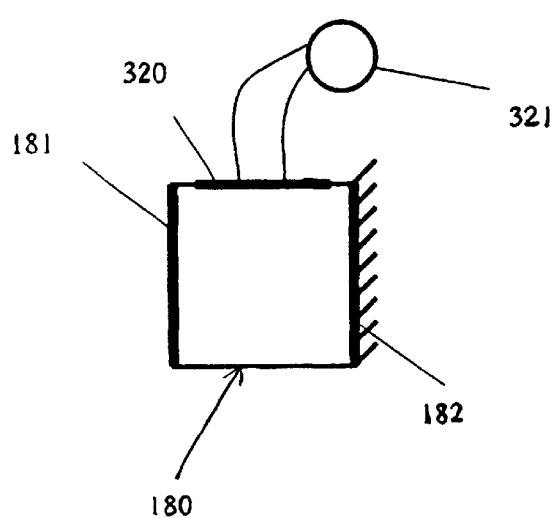
FIG. 13a is a side view of a single cavity GT etalon with a tunable resonant cavity.
Figure 13B:
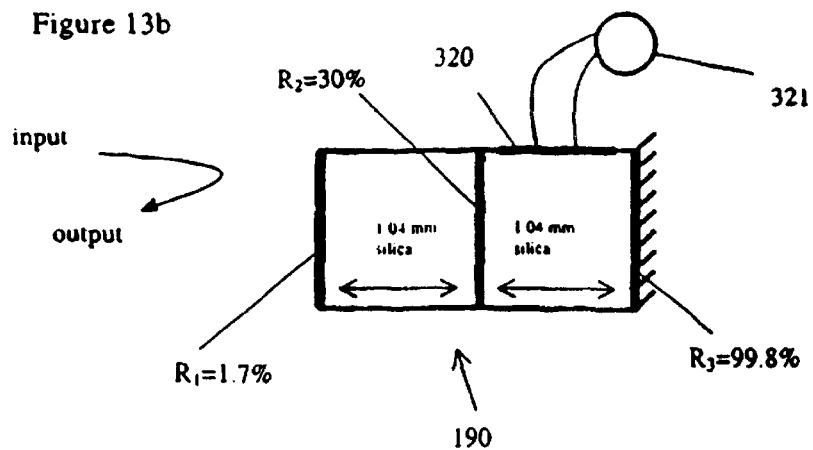
FIG. 13b is a side view of a 2 cavity GT etalon tuned to provide dispersion compensation for an output signal provided by an interleaver circuit.

In certain instances, it is desired to have some dispersion in each narrow band channel in a WDM system in order to suppress non-linear effects, which can introduce unwanted noise into the system. FIG. 4 illustrates a desired output response the dispersion compensator in accordance with this invention, wherein dispersion is plotted against wavelength. Thus, a device that will provide a periodic dispersion response that will substantially cancel the output response of FIG. 3 to result in the output response shown in FIG. 4 is required. The instant invention provides a device and method to achieve this end. FIG. 13b illustrates a two cavity GT etalon dispersion compensator having a free spectral range (FSR) of 100 GHz designed to compensate a signal with channels of width 0.2 nm separated by 100 GHz (about 0.8 nm). The FSR of the GT etalon should be matched to the channel width/spacing by properly selecting the cavity spacing, according to the formula $$d=c/(2*n*FSR)$$

where d is the cavity spacing, c is the speed of light, n is refractive index of the material forming the etalon cavity, and FSR is the free spectral range of the etalon, expressed in frequency units.

Figure 5:
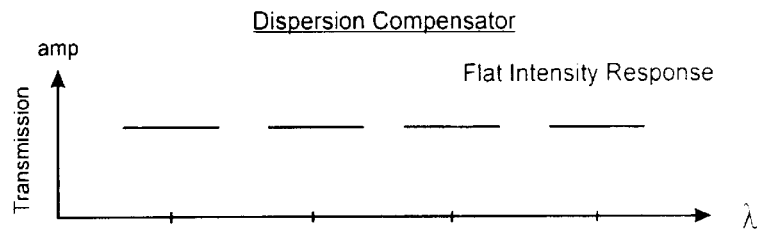
FIG. 5 is a graph of amplitude versus wavelength of an output response of a single cavity GT dispersion compensator in accordance with this invention.
Figure 6:
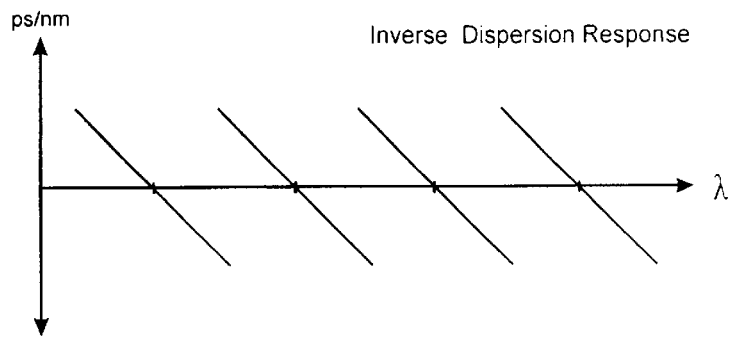
FIG. 6 is a graph of dispersion versus wavelength of an output response of the dispersion compensator in accordance with this invention.

The structure is similar to the Gires-Tournois interferometer described in a paper entitled 'Low-loss dispersion equalizer operable over the entire erbium window', D. Garthe, J. Ip, P. Colbourne, R. E. Epworth, W. S. Lee and A Hadjifotiou, Electronics Letters vol. 32, no. 4, 15 Feb. 15, 1996, pp. 371–372, but with a multi-cavity structure to modify the dispersion characteristics as required. In FIG. 13 the etalon is shown to have a first reflective surface having a reflectivity R1, a second reflective surface having a reflectivity R2, and a third reflective surface having a reflectivity R3 which is essentially 100% reflective. R2 and R3 have reflectivities greater than 0 and less than 100%. The two gaps between the three surfaces have thickness d1 and d2 which are equal or integer multiples of one another so as to give a periodic response. A periodic response is desirable when multiple wavelengths periodically spaced must be compensated. FIGS. 5 and 6 illustrate output responses of intensity versus wavelength and dispersion versus wavelength as required, to achieve an overall output response in dispersion given the input signal shown in FIG. 2. Special attention must be paid to obtain precisely equal spacings between the mirror surfaces of the multi-cavity device, since the spacing must be equal within a small fraction of a wavelength. This can be achieved by, for example, polishing both mirror spacers at the same time, and joining the parts by optical contacting techniques; in this case the mirror coatings should be designed such that the reflection phases of the coatings are equal. Alternatively, the device may be actively aligned during assembly to obtain the correct spacing between the mirrors.

Figure 7:
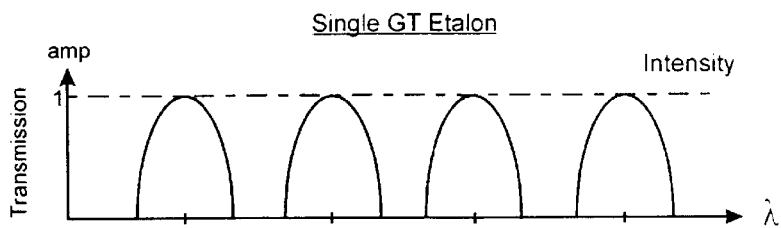
FIG. 7 is a graph of amplitude versus wavelength response for a white light input signal for a known single reflective/transmissive etalon illustrating the channels within the wavelength band of interest.
Figure 8:
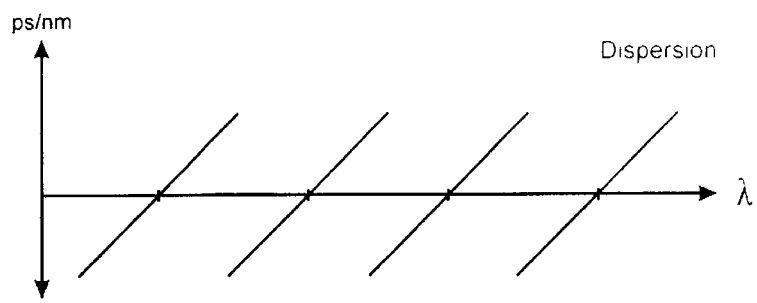
FIG. 8 is a graph of dispersion versus wavelength for the single etalon of FIG. 7.
Figure 9:
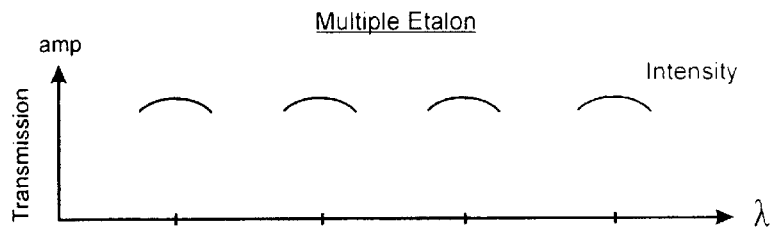
FIG. 9 is a a graph of more flat amplitude versus wavelength response for a white light input signal for a multiple etalon illustrating the channels within the wavelength band of interest.
Figure 10:
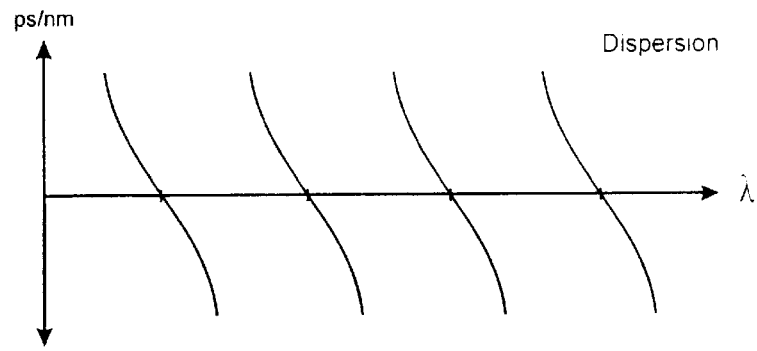
FIG. 10 is a graph of dispersion versus wavelength for the multiple etalon of FIG. 9.
Figure 11:
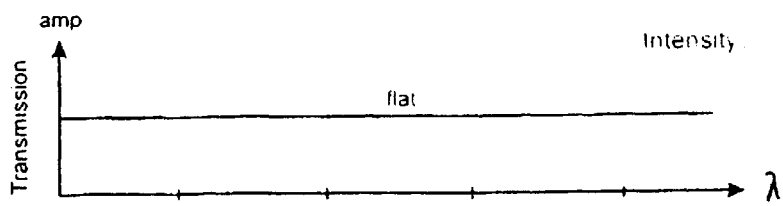
FIGS. 11 and 12 are graphs of intensity versus wavelength and dispersion versus wavelength for known prior art, non-periodic dispersion compensation means.
Figure 12:
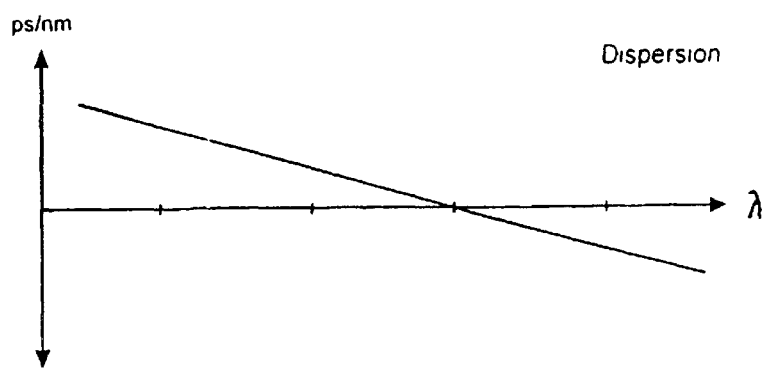

FIG. 5 indicates that a device having a substantially flat output response in intensity is required. Stated more simply, the intensity of the input signal should be constant after passing through the dispersion compensator. Its is desired to have as little attenuation as possible. This response is characteristic of a GT etalon. Essentially all of the energy put in, is returned, yielding a nearly flat amplitude output response. The mirror reflectivities are 0.8%, 24%, and 99.8%. In practice the loss may vary by 0.1–0.3 dB over wavelength. A substantially inverse dispersion characteristic as shown in FIG. 6, to that shown in FIG. 3 is required in order to produce compensation. FIG. 7 illustrates the amplitude and dispersion characteristic of a single etalon that is both transmissive and reflective. It can be seen that the amplitude response is a series of peaks at each center wavelength and FIG. 8 illustrates its dispersion characteristic. This periodic peaked amplitude response is not suitable. In contrast, the response shown in FIGS. 9 and 10 for a GT multiple etalon is preferred. The use of multiple etalons provides suitably wide bands or channels, having a substantially flat amplitude output response, and the dispersion characteristic shown in FIG. 10 is substantially opposite in slope to the dispersion of the input signal shown in FIG. 3, producing an overall dispersion as shown in FIG. 4. Of course, by varying the reflectivity of R1 and R2, tailored responses can be provided. Furthermore, additional cavities can be provided if required.

Figure 14:
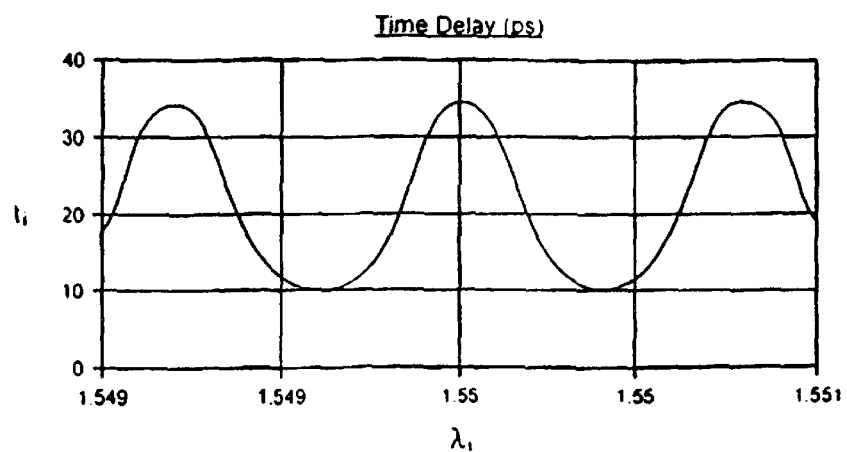
FIG. 14 is a plot of time delay versus wavelength for a dispersion compensator in accordance with an embodiment of this invention.
Figure 15:
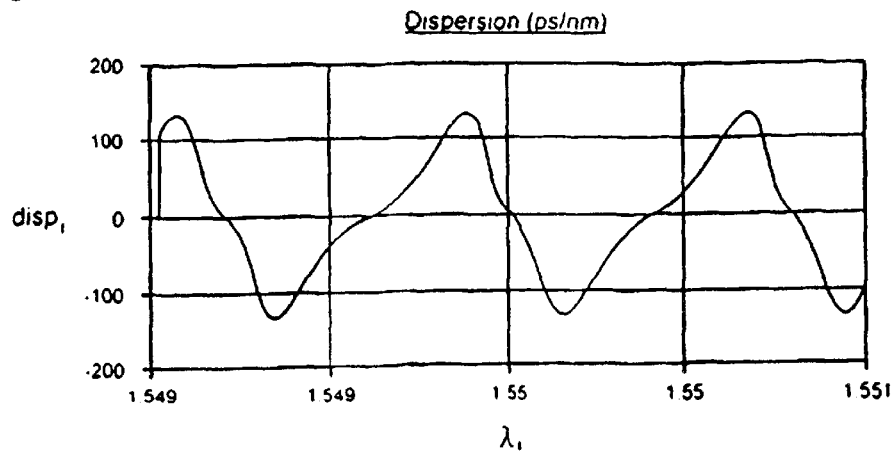
FIG. 15 is a graph which illustrates dispersion and its periodic nature for certain WDM devices.
Figure 18A:
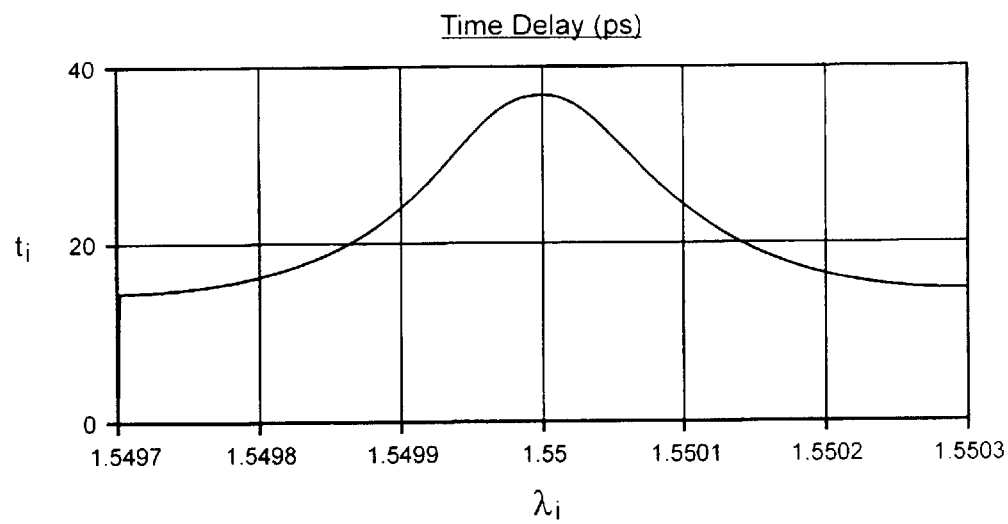
FIGS. 18a and 18b are graphs of time delay in (ps) and dispersion in ps/nm respectively, for a single cavity GT dispersion compensator.
Figure 18B:
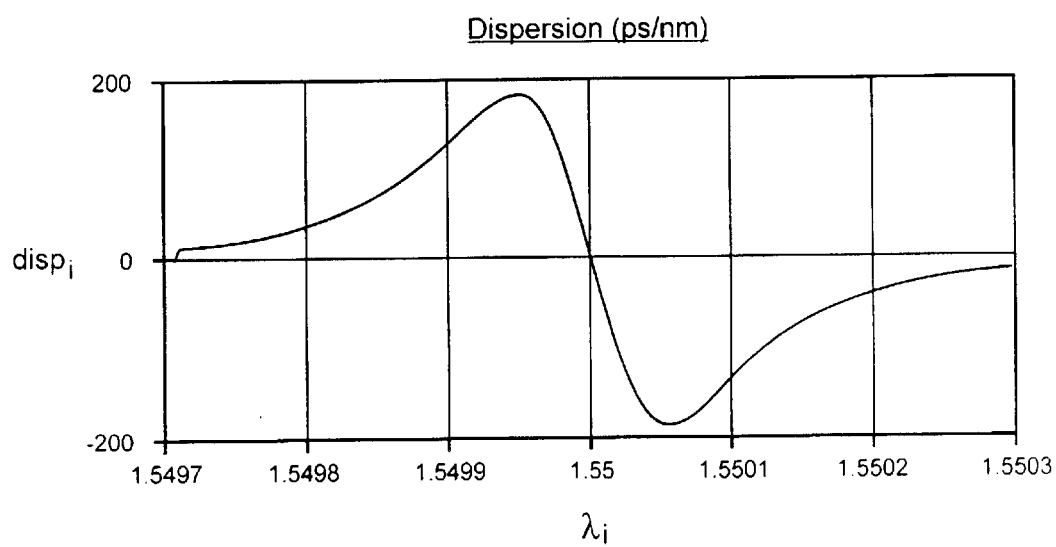

Turning now to FIG. 14, a plot is shown of a dual cavity dispersion compensator having a first cavity and GT cavity. The cavities are made of two blocks of silica providing a predetermined gap of 1.04 mm between reflective end faces. The device has a front input/output face having a reflectivity of 1.7%, an outward oppositely facing end face that is substantially totally reflective having a reflectivity of 99.8% and a second face having a reflectivity of 30% disposed between the front and outward facing end faces. The periodic nature of time delay versus wavelength is shown in FIG. 14. FIG. 15 illustrates dispersion, wherein the periodic nature of the dispersion is evident from the plot. By providing a dual cavity device a flatter top results in the time delay curve shown providing a closer fit to the delay characteristics of a typical device requiring compensation. In contrast and less preferred FIGS. 18a and 18b illustrate the dispersion characteristics of a single cavity GT compensator 180 (FIG. 13a) having reflectivities of 0.22 and 0.998 for the front and rear faces 181 and 182, respectively. The disadvantage of this device is that while suitable intensity response and dispersion slope can be obtained, the linear sloped region is not wide enough (in wavelength) to compensate the entire passband of the WDM device. The dual-cavity device shown in other embodiments enables a much wider channel to be compensated.

Figure 16A:
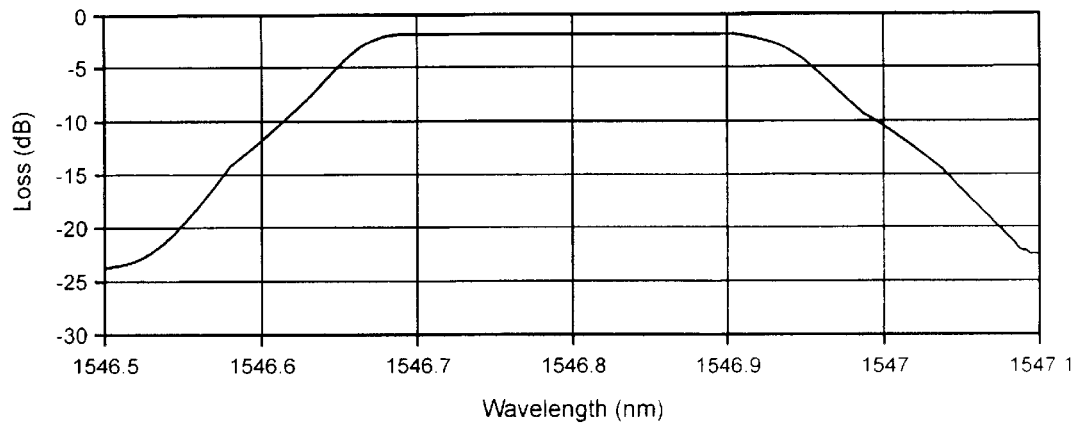
FIGS. 16a, 16b and 16c are graphs depicting the loss, group delay, and dispersion of a double WDM filter in the form of a double pass 50 GHz interleaver.
Figure 16B:
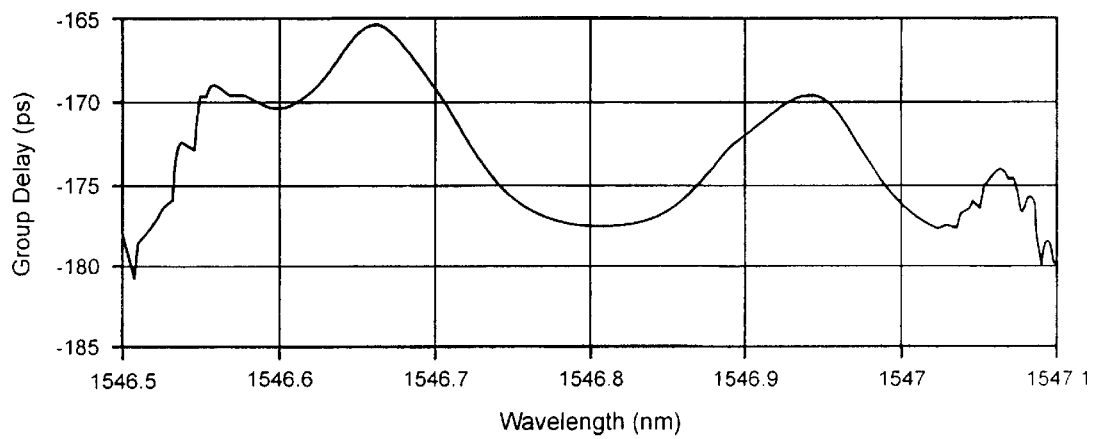
Figure 16C:
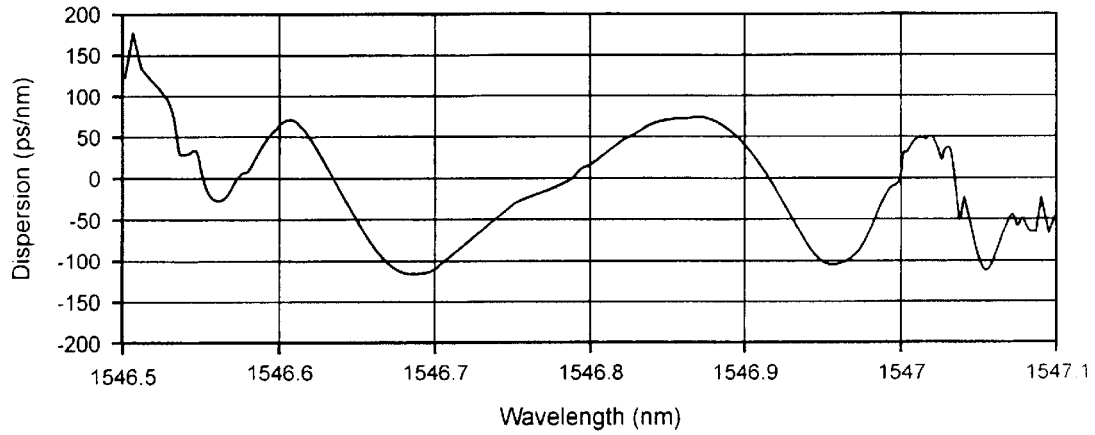

FIGS. 16a, 16b, and 16c are graphs of the loss, group delay and dispersion of a double WDM filter in the form of a double pass 50 GHz interleaver. Compensation is required ±0.1 nm from the channel centre.

Figure 17A:
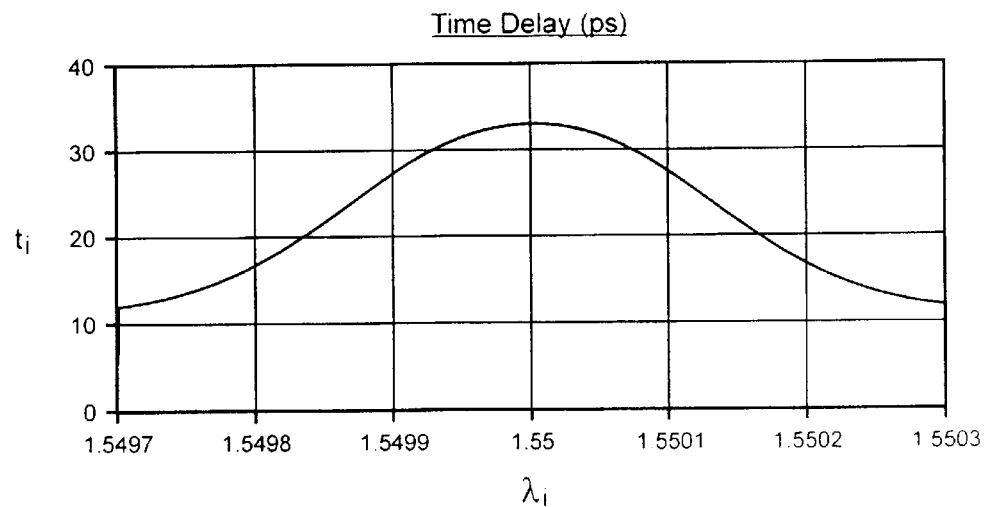
FIGS. 17a and 17b are graphs of time delay and dispersion, respectively, for a dispersion compensator having characteristics that will compensate for the device having characteristics shown if FIGS. 16a through 16c.
Figure 17B:
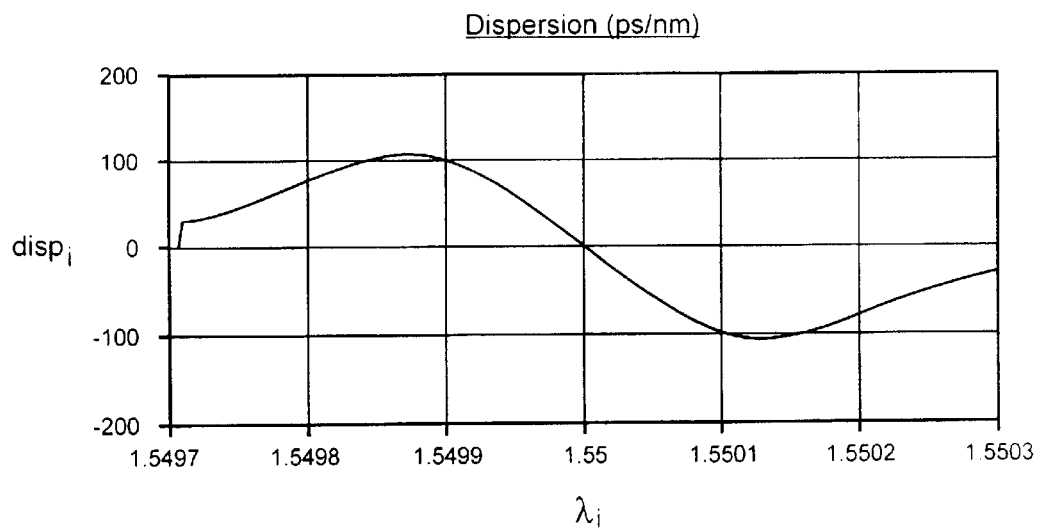

FIGS. 17a and 17b are graphs of time delay and dispersion, respectively, for a 2 cavity reflective dispersion compensator in accordance with the invention with mirror reflectivities 0.8%, 24% and 99.8%. As is shown, dispersion compensation approximately equal to and opposite to the actual device response shown in FIGS. 16a, 16b, and 16c is provided over the passband ±0.1 nm from the channel centre. The device in accordance with this invention is believed to be capable of providing compensation for the dispersion of FIG. 16c at every channel.

There are two surprising aspects to this invention. Firstly, the inventors have discovered that dispersion in a de-interleaved optical signal is periodic and not just linear across the entire band of wavelengths of interest. Secondly, is the discovery, that a GT etalon has a substantially opposite dispersion characteristic that is periodic; by selecting the period to match that of the interleaver, simultaneous compensation over a group of channels or wavelength bands of interest can be realized. Furthermore, by using a multiple cavity device whereon the cavities have the same period or multiples thereof, dispersion compensation and channel width can be controlled.

The advantage of the utilizing the device in accordance with the invention to compensate for a fixed repeated dispersion in for example an output signal received from a multiplexor suffering from periodically repeated dispersion characteristics is evident after viewing FIGS. 2 through 6. However, the invention can provide other unexpected advantages. Dispersion compensators such as dispersion compensating fiber can be used for providing a fixed negative or positive dispersion for optical fibres. However, dispersion compensating fiber cannot compensate for the wavelength dependence of dispersion. If the period in optical frequency of a WDM device (or centre channel wavelength) used in an optical fibre system is slightly different than the period (or centre channel wavelength) of the GT compensator, then at one end of the spectrum the GT compensator will be slightly lower in wavelength than the WDM device, resulting in a flat but negative dispersion, and at the other end of the spectrum the GT compensator will be slightly higher in wavelength than the WDM device, resulting in a flat but positive net dispersion. The GT resonator in accordance with this invention can compensate for (a) WDM dispersion within each channel passband, (b) residual slope of dispersion left over after conventional dispersion compensation techniques have been used by adjusting the period of the GT compensator, and (c) fine-tuning of dispersion level over all channels by adjusting the wavelength of the compensator. Referring once again to FIG. 4, after combining the periodic output response in FIG. 3 indicating periodic dispersion plotted with wavelength, and FIG. 6, which indicates substantially the inverse dispersion slope in accordance with and provided by the invention, the resultant dispersion output response of FIG. 4 is shown. It is noted that this flat line output response occurs due to the slight offset or difference in centre channel wavelength between the WDM device whose output is shown in FIG. 3, and the GT compensator in accordance with this invention. In order to obtain zero dispersion, the centre channels wavelength should correspond. Notwithstanding, this feature can be used as an advantage of the invention. For example, by varying the optical path length between the etalon end faces of the GT dispersion compensator, the channels' centre wavelengths can be varied to a slightly higher or lower wavelength. This tuning can be done by changing the angle of incidence of the input light, or by providing a change in temperature to the GT device, for example by providing a heating element 320, controlled by device 321, (FIGS. 13a and 13b) adjacent the etalon to heat the block, or conversely by providing cooling to lessen the optical path length. Thus by providing a temperature tunable GT device that is tunable, dispersion compensation for the WDM device having periodic dispersion is provided while the flat but present dispersion present in the optical fibre within the system can be compensated for by providing a required flat dispersion compensation that is afforded by fine tuning the GT cavity optical path length.

FIG. 19 illustrates a prior art coupled reflective cavity device in optical fibre for providing dispersion compensation. An input fibre 120 is directed to a circulator 150 for input into the fibre cavity device shown generally at 200. The fibre cavity device 200 has a series of Bragg grating reflectors 220, within the optical fiber 170 spaced apart to create coupled reflective cavities $\Phi_3$, $\Phi_2$, $\Phi_1$. The last reflector 220 has 100% reflectance. The response signal is reflected to the circulator 150 and output from the output fibre 130. The construction of the device in fibre is not suitable for telecommunications applications, however, because for typical FSR, for example 100 GHz, the cavity length is about 1 mm in glass. A Bragg grating reflector as illustrated in the prior art device of FIG. 19, if manufactured using commonly available grating-writing techniques, would need to be longer than 1 mm, and hence the structure could not be manufactured with such small cavity length. The prior art fibre or waveguide device requires a circulator, which is an expensive optical component.

FIGS. 20a and 20b show a bulk optic multi-cavity etalon 300, in accordance with the present invention. The etalon 300 has two partial reflectors 302, 304 and a last reflector 306 having 100% reflectance, which form two optical cavities 310, 312. A signal comprising multiple channels is input from an input fibre and collimating lens 314, via a focusing lens 316, which directs the beam into the etalon 300 at a first angle. The output response is reflected at a second opposite angle, and is thereby directed through the lens 316 to an output fibre and lens 318. As shown in FIGS. 20a and 20b, the angle of incidence into the etalon 300 can be easily selected by adjusting the position of the input and output fibres to direct the beam to a selected portion of the lens 316. Angle tuning provides fine adjustment to the FSR of the device 300, conveniently to match channel spacing. This adjustment is not possible in a fibre or waveguide device. As shown in FIG. 20a a high angle gives a shorter wavelength response, and as shown in FIG. 20b, a low angle provides a longer wavelength response. This bulk version has the advantage that the cavity spacing of about 1 mm is a convenient thickness for polishing of optical sheets, and thin film mirror coating technology can produce the required reflectors with only a few coating layers and hence a very small total thickness of the reflectors. Additional tuning can be provided by a heating or cooling element 320, which is adjusted using a controller 321. The element 320 is positioned proximate at least one of the resonant cavities of the multi-cavity etalon 300.

What we claim is:

1. A method of dispersion compensation for simultaneously compensating for dispersion present within individual channels in a multi-channel optical system having a multi-channel signal, having a predetermined channel spacing between adjacent channels, the method comprising the steps of:
   providing a GT resonator having an FSR that is substantially equal to or that is an integer multiple of the channel spacing of the multi-channel optical system or wherein the channel spacing is an integer multiple of the FSR of the GT resonator, the GT resonator including at least two optical cavities;
   launching the multi-channel signal into the GT resonator at a first angle and capturing a return signal from the GT resonator at a second angle; and
   fine-tuning the GT resonator by varying the first angle for launching the multi-channel signal into the GT resonator.

2. A method as defined in claim 1, wherein the GT resonator has an FSR in the range of 25 GHz to 400 GHz.

3. A method as defined in claim 1, wherein a dispersion characteristic of the GT resonator is substantially opposite in slope to dispersion of the multi-channel signal for minimizing dispersion in the return signal.

4. A method of simultaneously providing dispersion compensation within a plurality of channels in a multi-channel optical signal having predetermined channel spacing between adjacent channels, comprising the steps of:
   providing the multi-channel optical signal requiring dispersion compensation of individual channels therein;
   launching the multi-channel optical signal at a first angle into a periodic device having a substantially unchanging amplitude output response with respect of the wavelength of the optical signal, the periodic device having an output response which varies periodically in phase with respect to wavelength of the optical signal, the periodically varying phase having a correspondence with the channel spacing;
   fine-tuning the GT resonator by adjusting the first angle for launching the multi-channel optical signal into the periodic device; and,
   receiving a dispersion compensated output signal at a second angle having its dispersion adjusted by the periodic device in a periodic manner which has a correspondence to the channel spacing.

5. A method as defined in claim 4, wherein the periodic device has an FSR in the range of 25 GHz to 400 GHz.

6. A method as defined in claim 4, wherein a dispersion characteristic of the periodic device is substantially opposite in slope to dispersion of the multi-channel optical signal for minimizing dispersion in the return signal.

7. A dispersion compensation device for compensating a multi-channel optical signal having a channel spacings which is periodic, comprising:
   a multi-cavity etalon having at least one end face that is highly reflective and substantially not transmissive to light, and at least two other faces that are partly reflective and partly transmissive to light, the one end face and the at least two other faces being separated from one another by predetermined gaps forming at least two resonating cavities;
   an input port for launching a multi-channel signal into the multi-cavity etalon at a first angle;
   angle tuning means for adjusting the first angle, thereby tuning an optical path length of the multi-cavity etalon; and
   an output port for receiving a phase compensated output signal at a second angle;
   wherein the free-spectral range of at least one of the resonating cavities of the multi-cavity etalon is equal to or an integer multiple of the channel spacing of the multi-channel optical signal or the channel spacing of the multi-channel optical signal is an integer multiple of the free spectral range of at least one of the resonating cavities.

8. A dispersion compensation device as defined in claim 7, wherein the multi-cavity etalon has an FSR in the range of 25 GHz to 400 GHz.

9. A dispersion compensation device as defined in claim 7, wherein a dispersion characteristic of the multi-cavity etalon is substantially opposite in slope to dispersion of the multi-channel optical signal for minimizing dispersion in the output signal.

10. In a multi-channel optical system, having a multiplexed multi-channel optical signal wherein the optical signal has periodic dispersion repeating in each channel, the channels being spaced in periodic manner, wherein the distance between center wavelengths of adjacent channels is predetermined and a channel width is predetermined, a method of simultaneously compensating for the periodic dispersion in each channel comprising the steps of:

launching the optical signal at a first angle into a GT resonator having a tunable free spectral range and having an input/output response in amplitude that is substantially unchanging, and that has an input/output response that varies in dispersion periodically and substantially oppositely to the periodic dispersion repeating in each channel of the multi-channel optical signal; and tuning the GT resonator by varying the first angle.

11. An optical system for providing interleaving of optical channels into an optical signal and for providing dispersion compensation of the interleaved optical channels, comprising:

an interleaver optical circuit for interleaving the channels into the optical signal;

a multi-cavity etalon, one of the cavities being a GT cavity with an optical path length, at least one of the cavities having a free spectral range that corresponds with channels spacing of the interleaved optical channels, the multi-cavity etalon having a periodic dispersion characteristic that is substantially opposite in slope to the slope of periodic dispersion within the channels within the optical signal, the multi-cavity etalon being disposed to receive the optical signal from the interleaver optical circuit at a first angle and reflect the optical signal at a second angle, the multi-cavity etalon having an amplitude response that is substantially unchanging over wavelengths corresponding to the interleaved channels; and angle tuning means for adjusting the first angle for tuning the optical path length of the GT cavity.

\* \* \* \* \*